United States Patent
Pfau

(10) Patent No.: US 8,693,888 B2
(45) Date of Patent: Apr. 8, 2014

(54) NOISE-RESILIENT CONSTELLATIONS FOR AN OPTICAL TRANSPORT SYSTEM

(75) Inventor: Timo J. Pfau, Westfield, NJ (US)

(73) Assignee: Alcatel Lucent, Paris (FR)

( * ) Notice: Subject to any disclaimer, the term of this patent is extended or adjusted under 35 U.S.C. 154(b) by 112 days.

(21) Appl. No.: 13/347,072

(22) Filed: Jan. 10, 2012

(65) Prior Publication Data

US 2013/0177306 A1  Jul. 11, 2013

(51) Int. Cl.
- *H04B 10/00* (2013.01)
- *H04B 10/04* (2011.01)
- *H04B 10/12* (2011.01)

(52) U.S. Cl.
USPC ............................ 398/162; 398/140; 398/182

(58) Field of Classification Search
USPC .......... 398/140; 375/261, 322–324, 329–332; 329/304, 347
See application file for complete search history.

(56) References Cited

U.S. PATENT DOCUMENTS

| | | | |
|---|---|---|---|
| 6,249,180 B1 * | 6/2001 | Maalej et al. | 329/304 |
| 7,352,832 B1 | 4/2008 | Lewis et al. | |
| 7,986,878 B2 * | 7/2011 | Saunders et al. | 398/26 |
| 2003/0147655 A1 | 8/2003 | Shattil | |
| 2004/0042802 A1 | 3/2004 | Ho et al. | |
| 2009/0196602 A1 | 8/2009 | Saunders et al. | |
| 2010/0158521 A1 | 6/2010 | Doerr et al. | |
| 2010/0272195 A1 | 10/2010 | Rao et al. | |
| 2011/0038631 A1 | 2/2011 | Doerr | |
| 2011/0069749 A1 | 3/2011 | Forrester et al. | |

FOREIGN PATENT DOCUMENTS

WO  2010107439 A1  9/2010

OTHER PUBLICATIONS

Foschini et al, Optimization of Two-Dimension Signal Constellations in the Presence of Gaussian Noise (published in IEEE Transaction on Communications, vol. Com-22, No. 1, Jan. 1974).*

Liu, Novel Asterisk 16QAM Constellation for COFDM (published in IEEE Communications Letters, vol. 14, No. 7, Jul. 2010).*

Essiambre, René-Jean, et al., "Capacity Limits of Optical Fiber Networks," Journal of Lightwave Technology, vol. 28, No. 4, Feb. 15, 2010, pp. 662-701.

Li, Yang et al., "Design of Signal Constellations in the Presence of Phase Noise," IEEE 68th Vehicular Technology Conference, 2008, pp. 1-5.

* cited by examiner

*Primary Examiner* — Leslie Pascal
*Assistant Examiner* — Casey Kretzer
(74) *Attorney, Agent, or Firm* — Yuri A. Gruzdkov; Steve Mendelsohn; Mendelsohn, Drucker & Dunleavy, P.C.

(57) ABSTRACT

Various embodiments of a 16-QAM (quadrature-amplitude-modulation) constellation having one or more subsets of its sixteen constellation points arranged within respective one or more relatively narrow circular bands. Each of the subsets includes constellation points of at least two different amplitudes and may have between about six and about ten constellation points. Each of the circular bands may have a width that is between about 3% and about 20% of the maximum amplitude in the constellation.

18 Claims, 8 Drawing Sheets

TABLE 1: PROPERTIES OF PRIOR-ART CONSTELLATIONS 200-500

| CONSTELLATION | NUMBER OF CIRCLES (M) | RELATIVE AMPLITUDES ($A_i$) | NUMBER OF CONSTELLATION POINTS PER CIRCLE ($m_r$) | ROTATIONAL SYMMETRY ANGLE | NUMBER OF UNIQUE PHASE ANGLES |
|---|---|---|---|---|---|
| 200 | 3 | 0.3333<br>0.7454<br>1.0000 | 4<br>8<br>4 | $\pi/2$ | 12 |
| 300 | 1 | 1.0000 | 16 | $\pi/8$ | 16 |
| 400 | 2 | 0.5000<br>1.0000 | 8<br>8 | $\pi/4$ | 8 |
| 500 | 4 | 0.2500<br>0.5000<br>0.7500<br>1.0000 | 4<br>4<br>4<br>4 | $\pi/2$ | 4 |

*FIG. 12*

TABLE 2: PROPERTIES OF CONSTELLATIONS 700-1100

| CONSTELLATION | PRINCIPAL CONSTELLATION POINTS | NUMBER OF CIRCLES (M) | RELATIVE AMPLITUDES ($A_i$) | NUMBER OF CONSTELLATION POINTS PER CIRCLE ($m_r$) | ROTATIONAL SYMMETRY ANGLE | NUMBER OF UNIQUE PHASE ANGLES |
|---|---|---|---|---|---|---|
| 700 | 0.25<br>0.60j<br>0.62+0.41j<br>−0.62+0.41j<br>1.20j<br>1.25<br>0.91+0.95j<br>−0.91+0.95j | 6 | 0.1900<br>0.4561<br>0.5650<br>0.5650<br>0.9122<br>0.9502<br>1.0000<br>1.0000 | 2<br>2<br>4<br><br>2<br>2<br>4 | $\pi$ | 12 |
| 800 | 0.38<br>0.58+0.58j<br>1.15<br>0.96+0.96j | 4 | 0.2799<br>0.6042<br>0.8471<br>1.0000 | 4<br>4<br>4<br>4 | $\pi/2$ | 8 |
| 900 | 0<br>0.59<br>0.88+0.64j<br>1.29 | 4 | 0.0000<br>0.4574<br>0.8439<br>1.0000 | 1<br>5<br>5<br>5 | $2\pi/5$ | 10 |
| 1000 | 0.30+0.30j<br>0.81<br>0.90+0.70j<br>0.30+1.33j | 4 | 0.3112<br>0.5941<br>0.8363<br>1.0000 | 4<br>4<br>4<br>4 | $\pi/2$ | 16 |
| 1100 | 0<br>0.30+0.53j<br>0.63<br>0.93+0.78j<br>0.21+1.20j<br>1.26 | 6 | 0.0000<br>0.4833<br>0.5000<br>0.9633<br>0.9669<br>1.0000 | 1<br>3<br>3<br>3<br>3<br>3 | $2\pi/3$ | 12 |

NOISE-RESILIENT CONSTELLATIONS FOR AN OPTICAL TRANSPORT SYSTEM

BACKGROUND

1. Field

The invention relates to optical communication equipment and, more specifically but not exclusively, to constellations that can be used to encode data at a transmitter and decode the corresponding modulated optical signals at a receiver.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Constellations that encode four bits per symbol are of special interest to optical transport systems, e.g., because these constellations offer a good compromise between spectral efficiency and maximum achievable transmission distance. One example of such a constellation is a square 16-QAM (quadrature-amplitude-modulation) constellation. Although this constellation can provide good performance characteristics when used for optical channels in which the noise is dominated by additive white Gaussian noise (AWGN), it does not perform as well when used for data transmission over optical channels in which the noise has a significant non-AWGN component.

SUMMARY

Certain problems in the prior art are addressed by various embodiments of a 16-QAM (quadrature-amplitude-modulation) constellation having one or more subsets of its sixteen constellation points arranged within respective one or more relatively narrow circular bands. Each of the subsets includes constellation points of at least two different amplitudes and may have between about six and about ten constellation points. Each of the circular bands may have a width that is between about 3% and about 20% of the maximum amplitude in the constellation. The proposed embodiments can advantageously be used, for example, for improving noise resilience of a corresponding optical transport system when the noise has significant contributions from both the additive white Gaussian noise (AWGN) and phase noise.

According to one embodiment, provided is an apparatus comprising an optical receiver configured to decode an optical input signal using a first constellation consisting of sixteen constellation points. The first constellation is characterized by a first circular band that encloses a first subset of the sixteen constellation points. The first subset includes constellation points of at least two different amplitudes. The first circular band has a width that is smaller than about 20% of the maximum amplitude in the first constellation.

According to another embodiment, provided is an apparatus comprising an optical transmitter configured to generate an optical output signal in response to an input data stream and based on a first constellation consisting of sixteen constellation points. The first constellation is characterized by a first circular band that encloses a first subset of the sixteen constellation points. The first subset includes constellation points of at least two different amplitudes. The first circular band has a width that is smaller than about 20% of the maximum amplitude in the first constellation.

BRIEF DESCRIPTION OF THE DRAWINGS

Other aspects, features, and benefits of various embodiments of the invention will become more fully apparent, by way of example, from the following detailed description and the accompanying drawings, in which:

FIG. 6 shows a table that lists certain properties of the constellations shown in FIGS. 2-5;

FIG. 12 shows a table that lists certain properties of the constellations shown in FIGS. 7-11.

DETAILED DESCRIPTION

A representative fiber-optic link does not typically behave as a "pure" AWGN (additive white Gaussian noise) channel, e.g., because it is also impaired by a significant amount of phase noise originating from (i) lasers and/or (ii) nonlinear optical effects in the optical fiber itself. However, constellations that can be invoked to enable improved performance over an optical link that imposes arbitrary amounts of AWGN and phase noise have not been sufficiently developed previously.

Recent advances in the DAC (digital-to-analog converter) and ADC (analog-to-digital converter) technologies, which now offer a relatively high digital-signal resolution and a relatively high sampling rate, make customized constellations possible, e.g., because these technologies can support the use of constellation symbols having substantially arbitrary amplitude levels and/or phase angles. Various embodiments of the invention(s) disclosed herein seek to utilize these advances by providing optical-modulation schemes that can provide better performance characteristics for data transmission over phase-noise-impaired optical channels than comparable prior-art schemes.

Figure 1:
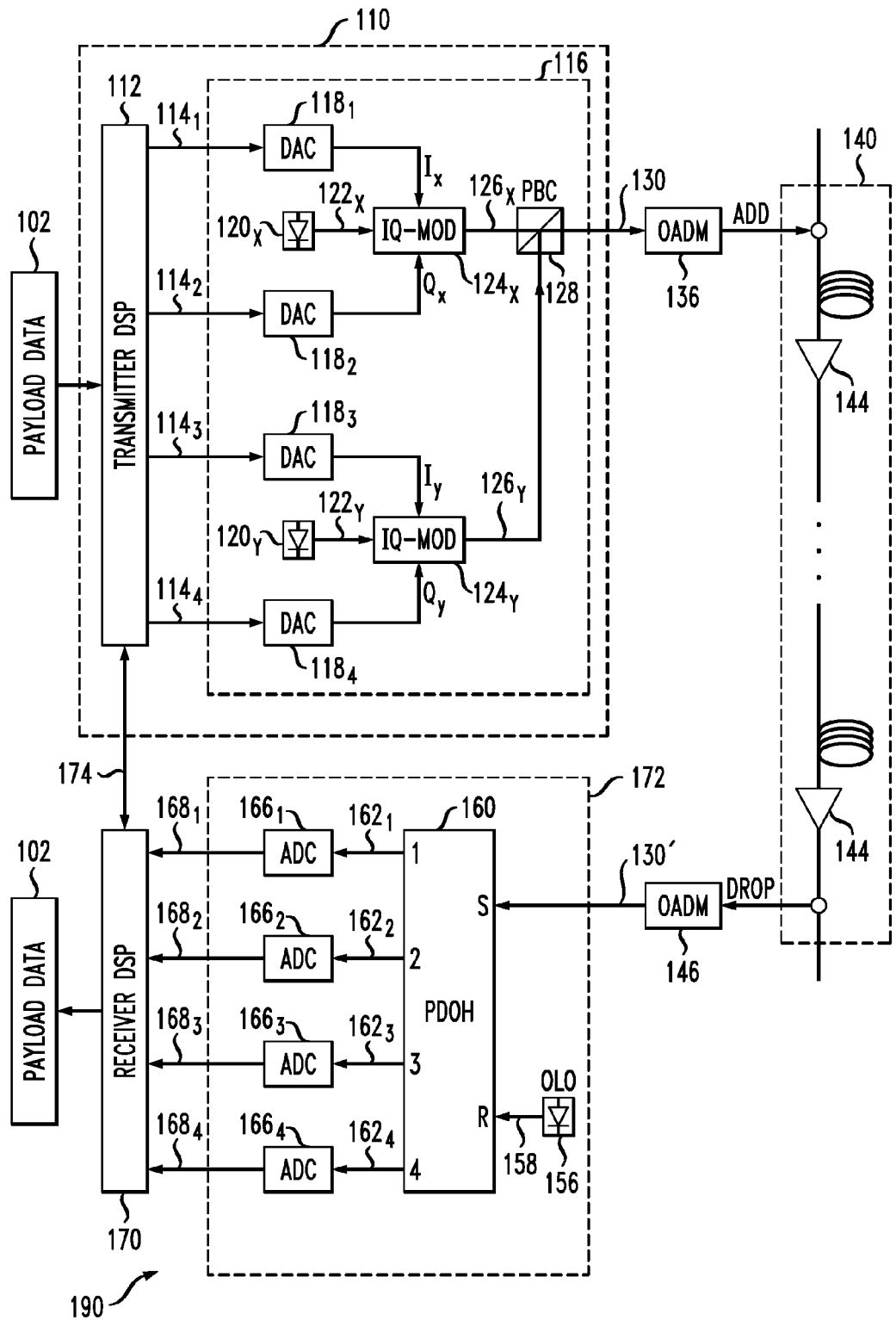
FIG. 1 shows a block diagram of an optical transport system in which various embodiments of the disclosure can be practiced.
Figure 2:
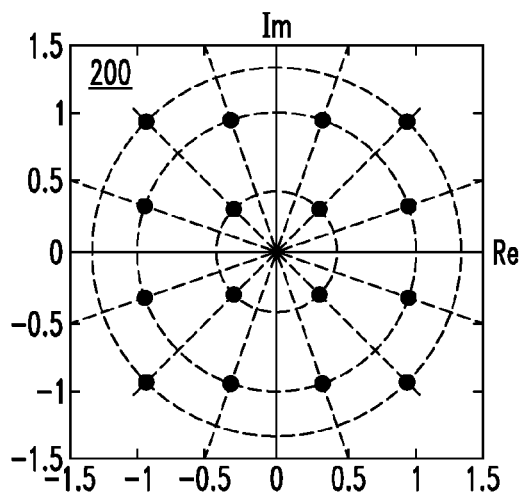
FIGS. 2-5 graphically show four representative prior-art constellations that can be used in various respective configurations of the optical transport system shown in FIG. 1.

FIG. 1 shows a block diagram of an optical transport system 100 according to one embodiment of the disclosure. System 100 has an optical transmitter 110 that is configured to generate optical symbols and apply a resulting optical output signal 130 to an optical transport link 140. System 100 also has an optical receiver 190 that is configured to appropriately process a corresponding optical input signal 130' received via optical transport link 140 from transmitter 110 to recover the corresponding original data. Note that optical transport link 140 transforms signal 130 into signal 130' by imposing various signal distortions including, inter alia, AWGN and phase noise. Both transmitter 110 and receiver 190 rely on the same specified constellation in the process of encoding data and decoding the corresponding optical signals, respectively.

Transmitter 110 receives an input stream 102 of payload data and applies it to a digital signal processor (DSP) 112. Processor 112 processes input stream 102 to generate digital signals $114_1$-$114_4$. More specifically, in each signaling interval (time slot), signals $114_1$ and $114_2$ carry digital values that represent the in-phase (I) component and quadrature-phase (Q) component, respectively, of a corresponding constellation symbol intended for transmission using X-polarized light. Signals $114_3$ and $114_3$ similarly carry digital values that represent the I and Q components, respectively, of the corresponding constellation symbol intended for transmission using Y-polarized light.

An electrical-to-optical (E/O) converter (also sometimes referred to as a front end) 116 of transmitter 110 transforms digital signals 114$_1$-114$_4$ into a modulated optical output signal 130. More specifically, digital-to-analog converters (DACs) 118$_1$ and 118$_2$ transform digital signals 114$_1$ and 114$_2$ into an analog form to generate drive signals I$_X$ and Q$_X$, respectively. Drive signals I$_X$ and Q$_X$ are then used, in a conventional manner, to drive an I-Q modulator 124$_X$. Based on drive signals I$_X$ and Q$_X$, I-Q modulator 124$_X$ modulates an X-polarized beam 122$_X$ of light supplied by a laser source 120$_X$, thereby generating a modulated optical signal 126$_X$.

DACs 118$_3$ and 118$_4$ similarly transform digital signals 114$_3$ and 114$_4$ into an analog form to generate drive signals I$_Y$ and Q$_Y$, respectively. Based on drive signals I$_Y$ and Q$_Y$, an I-Q modulator 124$_Y$ modulates a Y-polarized beam 122$_Y$ of light supplied by a laser source 120$_Y$, thereby generating a modulated optical signal 126$_Y$.

A polarization beam combiner 128 combines modulated optical signals 126$_X$ and 126$_Y$ to generate optical output signal 130.

Optical output signal 130 is applied to an optional optical add-drop multiplexer (OADM) 136 configured to add this signal, as known in the art, to other optical signals that are being transported via optical transport link 140.

Link 140 is illustratively shown as being an amplified link having a plurality of optical amplifiers 144 configured to amplify the optical signals that are being transported through the link, e.g., to counteract signal attenuation. Note that an optical link that does not have optical amplifiers can alternatively be used as well. After propagating the intended length of link 140, optical signal 130 is transformed into optical signal 130', which is dropped from the link via another optional optical add-drop multiplexer, OADM 146, and directed to receiver 190 for processing.

Receiver 190 has a front-end circuit 172 comprising an optical-to-electrical (O/E) converter 160, four analog-to-digital converters (ADCs) 166$_1$-166$_4$, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by optical local oscillator 156. Reference signal 158 has an optical-carrier frequency (wavelength) that is sufficiently close to that of signal 130' to enable its homodyne or intradyne detection. Reference signal 158 can be generated, e.g., using a tunable laser controlled by a wavelength-control loop (not explicitly shown in FIG. 1) that forces an output wavelength of the tunable laser to closely track the carrier wavelength of signal 130'.

O/E converter 160 operates to mix input signal 130' and reference signal 158 to generate eight mixed optical signals (not explicitly shown in FIG. 1). O/E converter 160 then converts the eight mixed optical signals into four electrical signals 162$_1$-162$_4$ that are indicative of complex values corresponding to the two orthogonal-polarization components of signal 130'. For example, electrical signals 162$_1$ and 162$_2$ may be an analog in-phase signal and an analog quadrature-phase signal, respectively, corresponding to the X-polarization component of signal 130'. Electrical signals 162$_3$ and 162$_4$ may similarly be an analog in-phase signal and an analog quadrature-phase signal, respectively, corresponding to the Y-polarization component of signal 130'.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals 162$_1$-162$_4$ generated by O/E converter 160 is converted into digital form in a corresponding one of ADCs 166$_1$-166$_4$. Optionally, each of electrical signals 162$_1$-162$_4$ may be amplified in a corresponding amplifier (not explicitly shown) prior to the resulting signal being converted into digital form. Digital signals 168$_1$-168$_4$ produced by ADCs 166$_1$-166$_4$ are then appropriately processed by a digital signal processor (DSP) 170 to recover the data of the original input stream 102 applied to transmitter 110.

Figure 3:
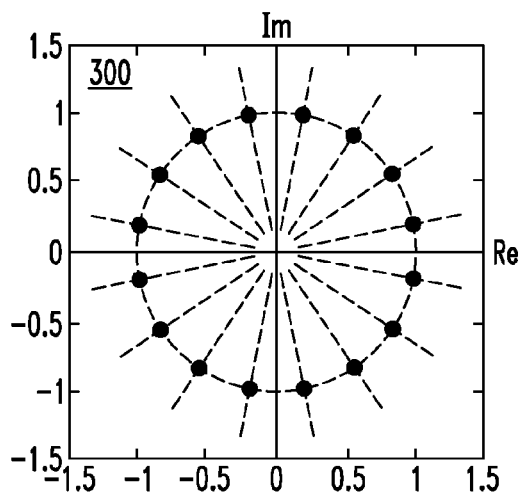
Figure 4:
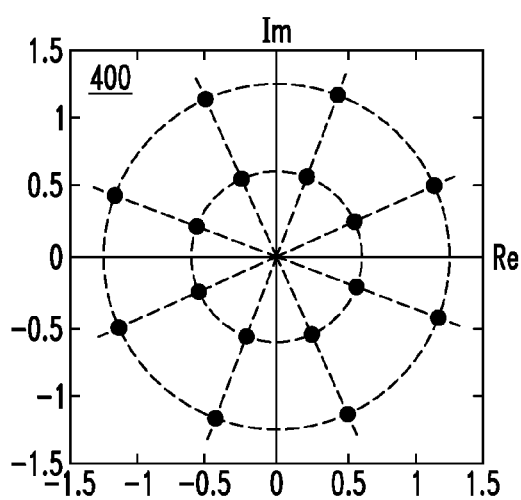
Figure 5:
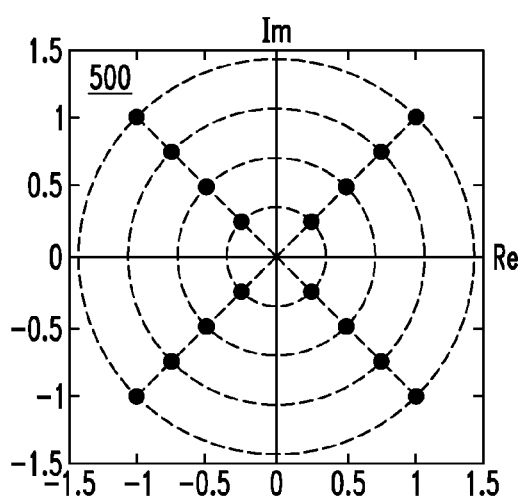
Figure 7:
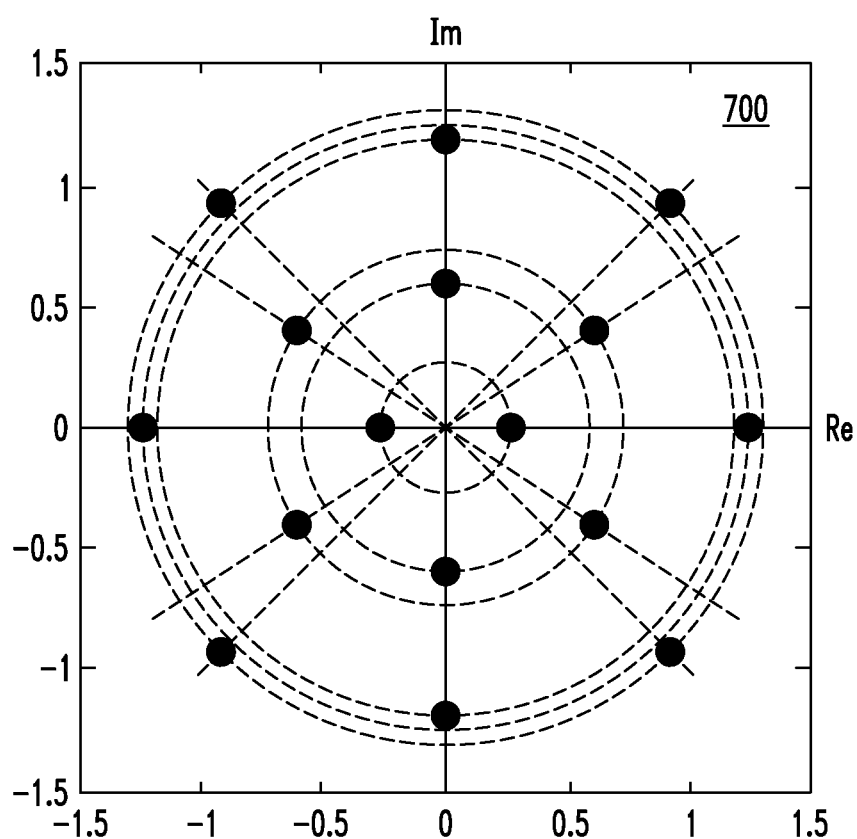
FIGS. 7-11 graphically show five representative constellations that can be used in various respective configurations of the optical transport system shown in FIG. 1 according to various embodiments of the disclosure.
Figure 8:
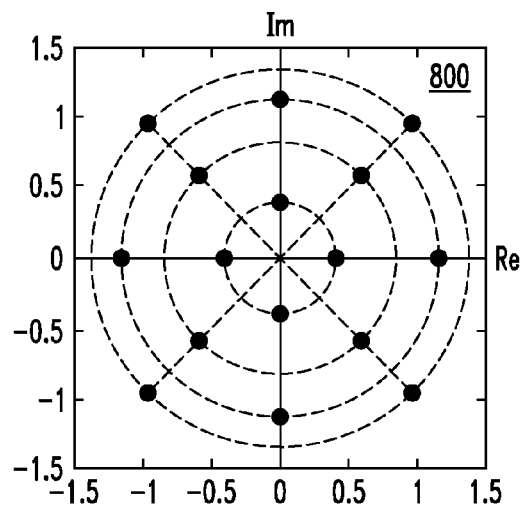
Figure 9:
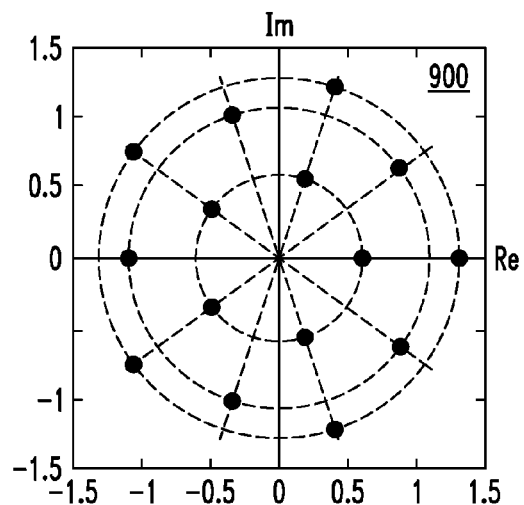
Figure 10:
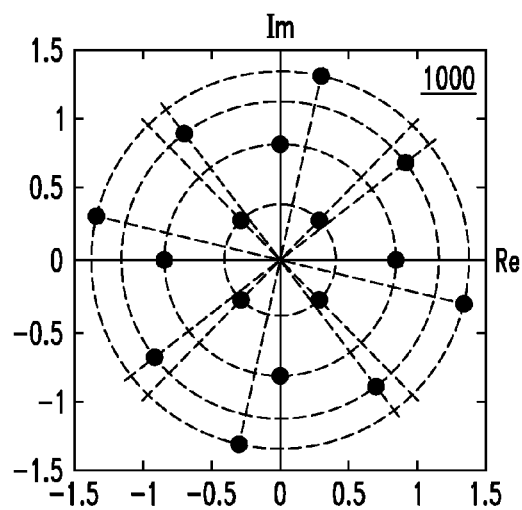
Figure 11:
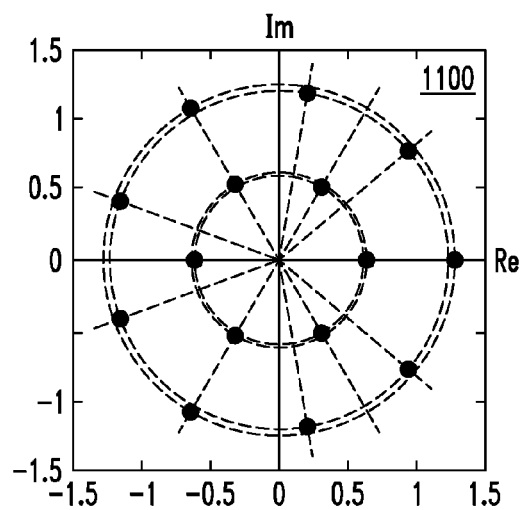

FIGS. 2-5 graphically show four representative prior-art constellations 200-500 that can be used in various respective configurations of system 100. More specifically, FIG. 2 graphically shows a square 16-QAM (quadrature-amplitude-modulation) constellation 200. FIG. 3 graphically shows a 16-PSK (phase-shift-keying) constellation 300. FIG. 4 graphically shows a 2-ASK/8-PSK (amplitude-shift-keying and phase-shift-keying) constellation 400. FIG. 5 graphically shows a 4-ASK/4-PSK constellation 500. Each of constellations 200-500 consists of sixteen constellation points arranged on a complex plane as indicated in the corresponding figure. Each constellation point or transition between constellation points encodes a respective bit-word that is 4 bits long. Various schemes of assigning bit-words to constellation points or transitions are possible. As known in the art, the modulus of a constellation point (e.g., the distance between the constellation point and the origin of the coordinate system) represents the amplitude of the electric field of the corresponding optical symbol. The argument of a constellation point (e.g., the angle between the real axis and the line that connects the constellation point to the origin of the coordinate system) represents the phase of the electric field of the corresponding optical symbol.

FIG. 6 shows a table (labeled Table 1) that lists certain properties of constellations 200-500. The first column in Table 1 lists constellations 200-500 in consecutive order. In each of constellations 200-500, the sixteen constellation points are arranged on one or more circles, each centered at the origin of the corresponding complex plane. The second column in Table 1 lists the number (M) of such circles for each of the constellations. The third column in Table 1 shows the relative amplitudes (A$_i$) of the electric fields corresponding to the constellation points located on each of the circles, with the amplitude corresponding to the respective outermost circle being the normalization factor. One of ordinary skill in the art will understand that these amplitude ratios are the same as the corresponding circle-radius ratios in the constellation diagrams shown in FIGS. 2-5. The fourth column in Table 1 shows the number (m$_r$) of constellation points that each of the circles has. The fifth column in Table 1 shows the constellation's rotational symmetry, which is expressed in terms of the smallest rotation angle that maps the constellation onto itself. Finally, the sixth column in Table 1 shows the number of unique phase angles for each constellation.

FIGS. 7-11 graphically show five constellations 700-1100 that can be used in various respective configurations of system 100 according to various embodiments of the disclosure. Each of constellations 700-1100 consists of sixteen constellation points having four or more different amplitudes and eight or more different phase angles. As such, each of constellations 700-1100 can be referred to as a circular 16-QAM (C16-QAM) constellation. Each constellation point or transition between constellation points encodes a respective bit-word that is 4 bits long. Various schemes of assigning bit-words to constellation points or transitions between constellation points are possible. Also note that each of constellations 900 (FIG. 9) and 1100 (FIG. 11) has a constellation point located at the origin of the complex plane.

FIG. 12 shows a table (labeled Table 2) that lists certain properties of constellations 700-1100. The first column in Table 2 lists constellations 700-1100 in consecutive order. The second column in Table 2 lists complex numbers corresponding to the principal constellation points for each of constellations 700-1100. The remaining constellation points of each constellation can be derived from its principal constellation points, e.g., by rotating the latter about the origin by an integer multiple of the rotation-symmetry angle shown in the sixth column of Table 2. Columns 3-7 in Table 2 are generally analogous to columns 2-6, respectively, in Table 1 (see FIG. 6).

Constellations 700-1100 differ from constellations 200-500 in several aspects, which appear significant for improving noise resilience of system 100 when the noise has significant contributions from both the additive white Gaussian noise (AWGN) and phase noise. The pertinent differences between constellations 700-1100 and constellations 200-500 are explained in more detail below in reference to Tables 1 and 2 (FIGS. 6 and 12). Representative performance advantages and benefits that can be attained in system 100 by using constellations 700-1100 instead of constellations 200-500 are illustrated further below in reference to FIGS. 13-14.

Referring to Tables 1 and 2 (FIGS. 6 and 12), each of constellations 700-1100 has at least four unique relative amplitudes and at least eight unique phase angles (see columns 3 and 7 in Table 2). Moreover, two of the constellations (i.e., 700 and 1100) have six unique relative amplitudes. Four of the constellations (i.e., 700 and 900-1100) have at least ten unique phase angles; three of the constellations (i.e., 700 and 1000-1100) have at least twelve unique phase angles; and constellation 1000 has sixteen unique phase angles. In contrast, among constellations 200-500, only constellation 500 has four unique relative amplitudes (see column 2 in Table 1). However, unlike any of constellations 700-1100, constellation 500 has only four unique phase angles (see column 6 in Table 1).

A convenient parameter that can be used to quantify this particular aspect of the differences between constellations 700-1100 and constellations 200-500 appears to be a product of the number of unique amplitudes and the number of unique phase angles. More specifically, among constellations 200-500, constellation 200 has the highest value of such a product, which is thirty six (36). For comparison, among constellations 700-1100, four constellations (i.e., 700 and 900-1100) have a product value of at least forty (40); three of the constellations (i.e., 700 and 1000-1100) have a product value of at least sixty four (64); and two of the constellations (i.e., 700 and 1100*b*) have a product value of seventy two (72).

Comparison of the relative amplitudes listed in column 3 of Table 1 and column 4 of Table 2 reveals that each of constellations 700-1100 is characterized by the existence of at least one relatively narrow circular band that encloses a plurality of constellation points of at least two different amplitudes, said circular band having a width that is smaller than about 20% of the maximum amplitude in the constellation.

For example, constellation 700 has (i) a first circular band of eight constellation points of three different amplitudes (1.0000, 0.9502, and 0.9122) having a width that is smaller than about 9% of the maximum amplitude and (ii) a second circular band of six constellation points of two different amplitudes (0.5650 and 0.4561) having a width that is smaller than about 11% of the maximum amplitude.

Constellation 800 has a circular band of eight constellation points of two different amplitudes (1.0000 and 0.8471) having a width that is smaller than about 16% of the maximum amplitude.

Constellation 900 has a circular band of ten constellation points of two different amplitudes (1.0000 and 0.8439) having a width that is smaller than about 16% of the maximum amplitude.

Constellation 1000 has a circular band of eight constellation points of two different amplitudes (1.0000 and 0.8363) having a width that is smaller than about 17% of the maximum amplitude.

Constellation 1100 has (i) a first circular band of nine constellation points of three different amplitudes (1.0000, 0.9669, and 0.9633) having a width that is smaller than about 4% of the maximum amplitude and (ii) a second circular band of six constellation points of two different amplitudes (0.5000 and 0.4833) having a width that is smaller than about 12% of the maximum amplitude.

In contrast, among constellations 200-500, the narrowest circular band that encloses a plurality of constellation points of at least two different amplitudes has a width that is 25% of the constellation's maximum amplitude (see constellation 500, FIG. 5).

Eq. (1) defines a performance metric (L) that can be used to evaluate the performance of the various above-described constellations:

$$L = \log\left\{\sum_p \sum_{q \neq p} \exp\left\{-16\left[(|x_p| - |x_q|)^2 + \frac{1}{1+\Delta}\left(\frac{|x_p| + |x_q|}{2}\right)^2 (\arg\{x_p\} - \arg\{x_q\})^2\right]\right\}\right\} \quad (1)$$

where $x_p$ and $x_q$ (p=1, 2, ... 16; q=1, 2, ... 16) are the complex numbers representing the constellation points (see, e.g., FIG. 12: the second column in Table 2), and $\Delta$ is defined by Eq. (2):

$$\Delta = \frac{\sigma_{PN}^2}{\sigma_{AWGN}^2} \quad (2)$$

where $\sigma_{PN}^2$ is the phase-noise variance, and $\sigma_{AWGN}^2$ is the AWGN variance. One skilled in the art will appreciate that performance metric L is based on the log-likelihood ratio for a generic 16-QAM constellation, in which the error probability is evaluated based on the pair-wise distances between the constellation points in the constellation. The latter becomes more fully apparent by comparing the right side of Eq. (1) with Eq. (3):

$$d_{pq}^2 = (\text{Re}\{x_p\} - \text{Re}\{x_q\})^2 + (\text{Im}\{x_p\} - \text{Im}\{x_q\})^2 \approx \\ (|x_p| - |x_q|)^2 + \left(\frac{|x_p| + |x_q|}{2}\right)^2 (\arg\{x_p\} - \arg\{x_q\})^2 \quad (3)$$

where $d_{pq}$ is the distance on the complex plane between the constellation points represented by $x_p$ and $x_q$. One skilled in the art will also appreciate that a smaller value of L corresponds to a smaller symbol-error rate (SER).

By calculating performance metric L for each of constellations 200-500 and 700-1100 at any particular value of Δ and then comparing the results, one can estimate the relative expected performance characteristics of these constellations at the levels of the AWGN and phase noise corresponding to that value of Δ. For example, for Δ=1 (i.e., the conditions corresponding to equally strong AWGN and phase noise), any of constellations 700-1100 has a smaller value of performance metric L than any of constellations 200-500. This result demonstrates that constellations 700-1100 are expected to generally outperform constellations 200-500 when a significant amount of phase noise is present in the system.

Further comparative evaluation of the performance of constellations 200-500 and 700-1100 is given below in reference to FIGS. 13-14.

Figure 13B:
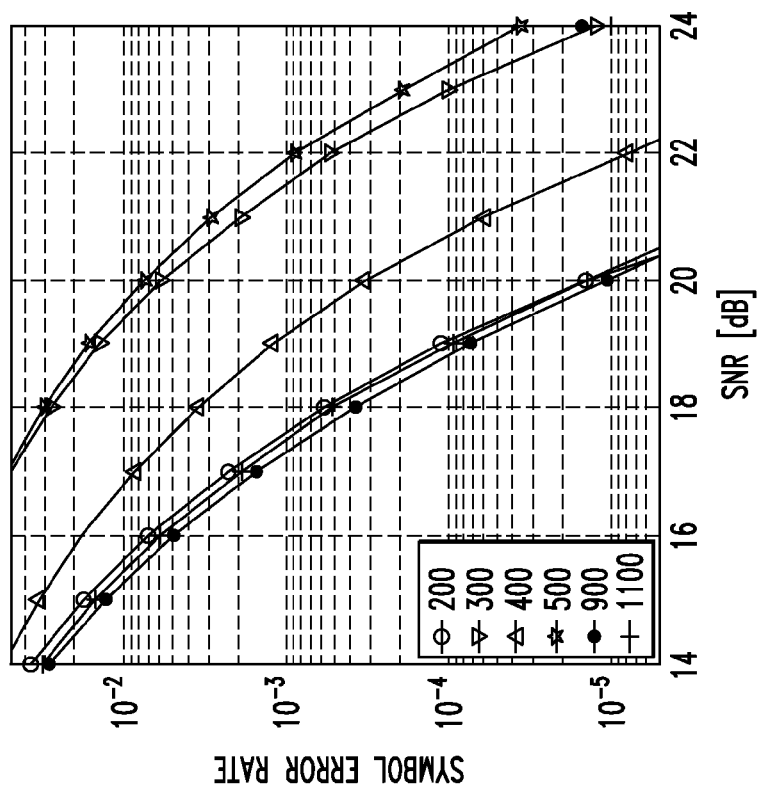
FIGS. 13-14 graphically compare certain performance characteristics of the constellations shown in FIGS. 2-5 and 7-11.
Figure 13A:
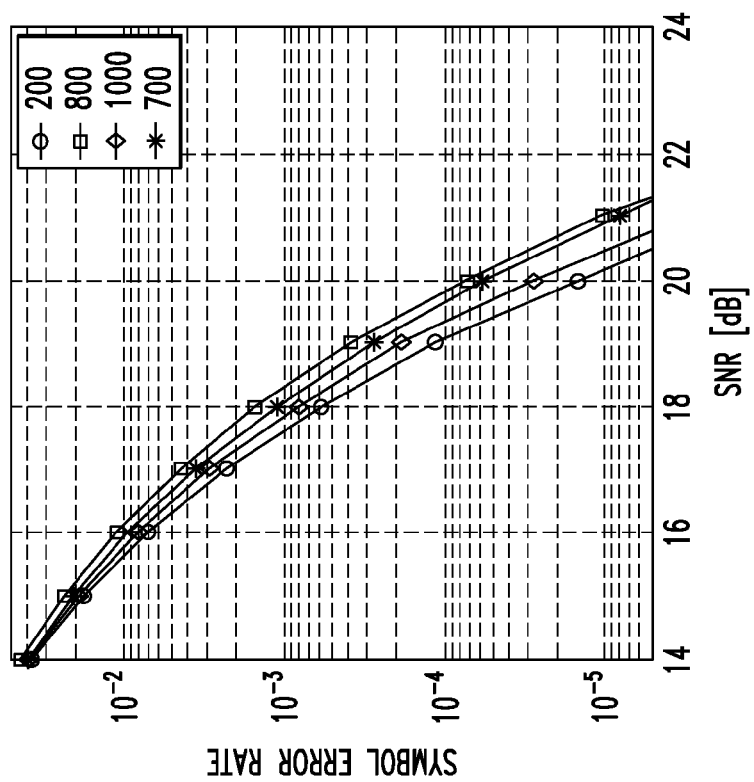

FIGS. 13A-13B graphically show the symbol-error rate (SER) as a function of normalized signal-to-noise ratio (SNR) for each of constellations 200-500 and 700-1100. The data shown in FIGS. 13A-13B were obtained using numerical simulations of system 100, with the noise in optical transport link 140 being modeled by "pure" additive white Gaussian noise (AWGN). The numerical simulations modeled a transmission of $10^7$ constellation symbols. The average power per symbol was normalized to one.

As indicated by the simulation results shown in FIG. 13B, constellation 200 is the best-performing constellation under the simulated conditions in the set consisting of constellations 200-500. This assessment is true, for example, because constellation 200 (i) provides a smaller SER than the other constellations in the set for a given SNR and/or (ii) needs a smaller SNR than the other constellations in the set to provide a given SER. For similar reasons, it is evident that constellations 900 and 1100 perform better than constellation 200 under the simulated conditions. As indicated by the simulation results shown in FIG. 13A, constellations 700, 800, and 1000 perform slightly worse under the simulated conditions than constellation 200. However, a comparison of the simulation results shown in FIGS. 13A and 13B clearly indicates that constellations 700, 800, and 1000 still perform significantly better than any of constellations 300-500.

Figure 14B:
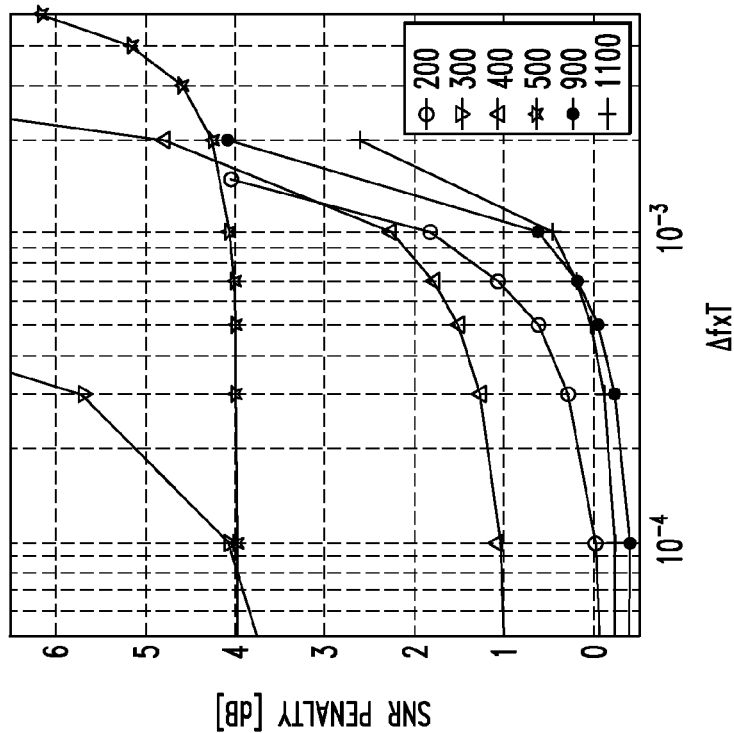
Figure 14A:
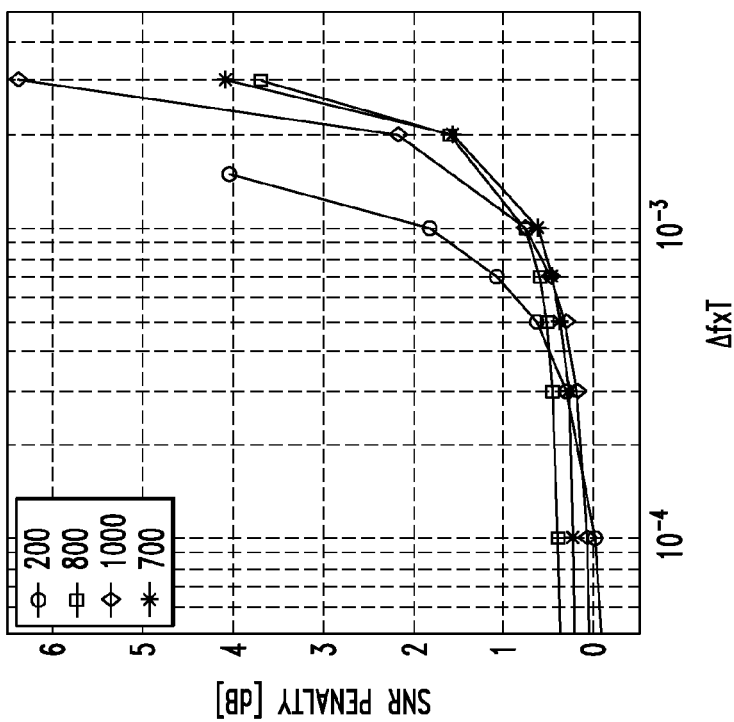

FIGS. 14A-14B graphically show an SNR penalty at SER=$10^{-2}$ as a function of the product of the linewidth and symbol period for each of constellations 200-500 and 700-1100. More specifically, the SNR penalty shown in FIGS. 14A-14B is defined as the SNR increase that is needed to maintain the SER of $10^{-2}$ when a specified amount of phase noise is added to a fixed amount of AWGN. The phase noise was modeled as a Wiener process with the fluctuation speed defined by the variance $\sigma^2 = 2\pi \Delta f \times T$, where $\Delta f$ is the combined linewidth of the signal and the local oscillator, and T is the symbol period. Thus, the abscissa in FIGS. 14A-14B provides a measure of the phase noise. Similar to the numerical simulations corresponding to FIGS. 13A-13B, the numerical simulations corresponding to FIGS. 14A-14B modeled a transmission of $10^7$ constellation symbols.

As evident from the simulation results shown in FIG. 14B, constellations 900 and 1100 have a lower SNR penalty than that of any of constellations 200-500 at all tested phase-noise levels. Constellation 200 is again the best-performing constellation in the set consisting of constellations 200-500. As further evident from the simulation results shown in FIG. 14A, constellations 700, 800, and 1000 have a lower SNR penalty than that of constellation 200 at the phase-noise levels corresponding to $\Delta f \times T > \sim 4 \times 10^{-4}$. In addition, constellations 700, 800, and 1000 appear to outperform constellations 900 and 1100 at phase-noise levels corresponding to $\Delta f \times T > \sim 10^{-3}$.

Referring back to FIG. 1, in one embodiment, DSP 170 is configured to continuously monitor the AWGN and phase-noise levels corresponding to the transmission channel between transmitter 110 and receiver 190, e.g., based on the noise statistics acquired from the processing of digital signals $168_1$-$168_4$. Using the observed phase-noise level, DSP 170 is configured to determine a constellation that provides optimum performance for that particular phase-noise level and communicate this information, e.g., via a control signal 174, to DSP 112. Transmitter 110 and receiver 190 can then employ that particular constellation for data transport between them, thereby realizing the concomitant performance advantages/benefits under the present channel conditions. For example, as already indicated above, at a relatively low phase-noise level, one of constellations 900 and 1100 can be selected and used in system 100 (see, e.g., FIGS. 14A-14B). Similarly, at a relatively high phase-noise level, one of constellations 700, 800, and 1000 can be selected and used in system 100 (also see FIGS. 14A-14B). If the phase-noise level changes over time, then transmitter 110 and receiver 190 can use control signal 174 to change the operative constellation in a coordinated manner, as appropriate or necessary for maintaining optimal system-performance characteristics.

One skilled in art will appreciate that the banded structure of constellations 700-1100 imposes certain limitations on the minimum digital resolution, at which DACs 118 and ADCs 166 need to operate, for system 100 to benefit from the advantageous performance characteristics of these constellations. Numerical simulations show that, in general, the effective digital resolution of about 4.5 bits or higher is sufficient for system 100 to benefit from the use of constellations 700-1100.

While this invention has been described with reference to illustrative embodiments, this description is not intended to be construed in a limiting sense.

For example, various embodiments disclosed herein can be used with various signal-multiplexing schemes, such as wavelength-division multiplexing (WDM), polarization-division multiplexing (PDM), and space-division multiplexing (SDM). Principles of the invention can be applied to construct noise-resilient constellations of various other sizes.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical receiver configured to decode an optical input signal using a first constellation consisting of sixteen constellation points, wherein:
   the first constellation is characterized by a first circular band that encloses a first subset of the sixteen constellation points;
   the first subset includes constellation points of at least two different amplitudes;
   the first circular band has a width that is smaller than 20% of a maximum amplitude in the first constellation; and
   the first subset has at least nine constellation points.

2. The apparatus of claim 1, wherein:
   the first subset includes constellation points of exactly three different amplitudes; and
   the width is smaller than about 10% of the maximum amplitude.

3. The apparatus of claim 1, wherein:
   the first subset consists of nine constellation points; and
   the width is smaller than about 5% of the maximum amplitude.

4. The apparatus of claim 1, wherein:
   the first constellation is further characterized by a second circular band that encloses a second subset of the sixteen constellation points;
   the second subset includes constellation points of at least two different amplitudes;
   the first subset and the second subset have no constellation points in common; and
   the second circular band has a width that is smaller than about 12% of the maximum amplitude.

5. The apparatus of claim 4, wherein:
   the second subset has six constellation points; and
   the second circular band has a width that is smaller than about 5% of the maximum amplitude.

6. The apparatus of claim 1, wherein the first constellation includes constellation points of at least four different amplitudes and at least eight different phase angles.

7. The apparatus of claim 6, wherein the first constellation includes constellation points of six different amplitudes.

8. The apparatus of claim 6, wherein the first constellation includes constellation points of exactly ten different phase angles.

9. The apparatus of claim 6, wherein the first constellation includes constellation points of exactly twelve different phase angles.

10. The apparatus of claim 1, wherein the optical receiver is configured to:
    monitor a relative level of phase noise versus additive white Gaussian noise corresponding to the optical input signal;
    based on the relative level, cause the first constellation to be replaced by a second constellation consisting of sixteen constellation points; and
    decode a subsequent portion of the optical input signal using the second constellation.

11. The apparatus of claim 10, further comprising an optical transmitter configured to transmit the optical input signal to the optical receiver, wherein:
    the optical receiver is configured to send a control signal to the optical transmitter to cause the optical transmitter to replace the first constellation by the second constellation for subsequent transmission;
    the second constellation is characterized by a first circular band that encloses a first subset of the sixteen constellation points of the second constellation;
    said first subset of the second constellation includes constellation points of at least two different amplitudes; and said first circular band of the second constellation has a width that is smaller than about 20% of a maximum amplitude in the second constellation.

12. The apparatus of claim 1, wherein the optical receiver comprises:
   a front-end circuit configured to convert the optical input signal into a corresponding plurality of digital electrical signals; and
   a processor configured to decode the digital electrical signals using the first constellation.

13. An apparatus comprising an optical transmitter configured to generate an optical output signal in response to an input data stream and based on a first constellation consisting of sixteen constellation points, wherein:
   the first constellation is characterized by a first circular band that encloses a first subset of the sixteen constellation points;
   the first subset includes constellation points of at least two different amplitudes;
   the first circular band has a width that is smaller than 20% of a maximum amplitude in the first constellation; and
   the first subset has at least nine constellation points.

14. The apparatus of claim 13, wherein:
   the first subset includes constellation points of exactly three different amplitudes; and
   the width is smaller than about 10% of the maximum amplitude.

15. The apparatus of claim 13, wherein:
   the first constellation is further characterized by a second circular band that encloses a second subset of the sixteen constellation points;
   the second subset includes constellation points of at least two different amplitudes;
   the first subset and the second subset have no constellation points in common; and
   the second circular band has a width that is smaller than about 12% of the maximum amplitude.

16. The apparatus of claim 13, wherein the first constellation includes constellation points of at least four different amplitudes and at least eight different phase angles.

17. The apparatus of claim 16, wherein the first constellation includes constellation points of six different amplitudes.

18. The apparatus of claim 16, wherein the first constellation includes constellation points of exactly ten different phase angles.

* * * * *